May 29, 1956      E. LANGNER      2,747,833
WEDGE VALVE

Filed Aug. 31, 1951      2 Sheets-Sheet 1

Inventor:
Emil Langner.
By Joseph O. Lange, Atty.

May 29, 1956  E. LANGNER  2,747,833
WEDGE VALVE
Filed Aug. 31, 1951  2 Sheets-Sheet 2
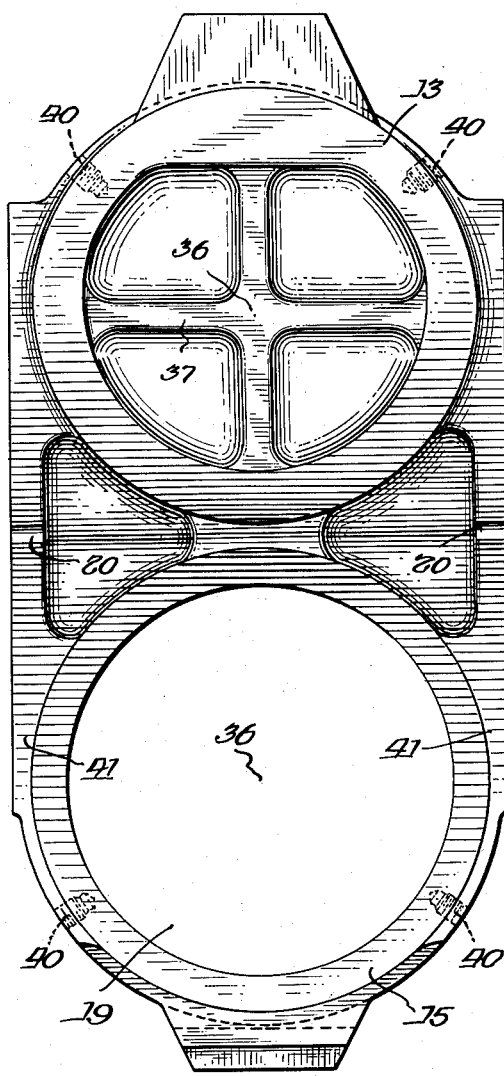
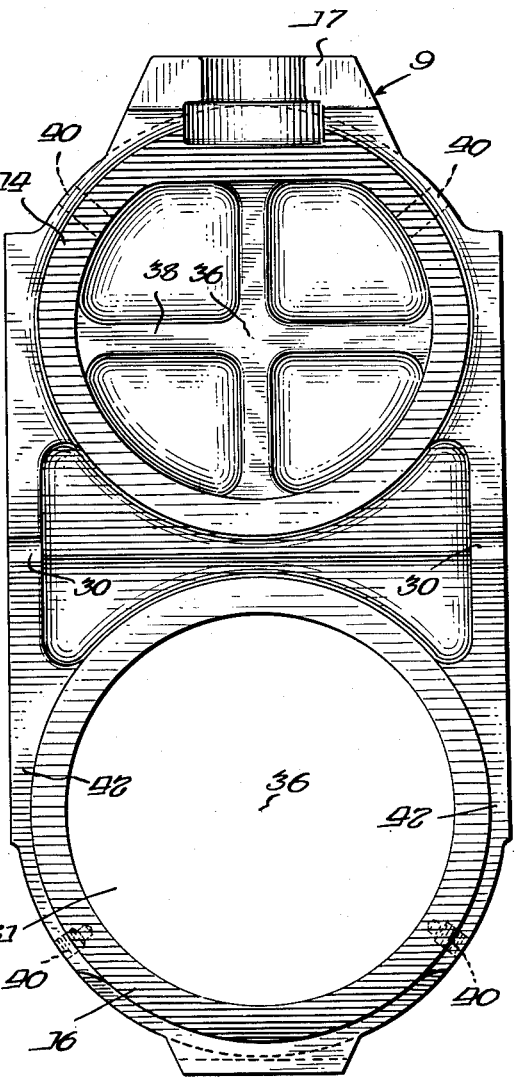
Inventor.
Emil Langner.
By Joseph O. Langr
Atty.

United States Patent Office 2,747,833
Patented May 29, 1956

2,747,833

WEDGE VALVE

Emil Langner, Chicago, Ill., assignor to Crane Co., Chicago, Ill., a corporation of Illinois Application August 31, 1951, Serial No. 244,634

1 Claim. (Cl. 251—196)

This invention relates to valves and, more particularly, to an improvement in double wedge disc gate valves, commonly known as a conduit type of gate valves for pipe lines, such as oil transport or the like.

To acquire an accurate appraisal of the benefits to be derived from this contribution, it should be understood at the outset that this invention relates to a design of valve structure in which a better and more economical method of machining valve discs is accomplished.

In these valves, it will be appreciated that a double wedge is employed to the extent that two converging inclined wedging surfaces on the both sides of the discs have been used. However, in the previous structures, it has been necessary to mill the surfaces, in which case, the milling operation has been a long and tedious one as well as being very costly. Frequently, too, it has been found that the milling operation has resulted in uneven and inaccurate machined surfaces which often prevented the discs from wedging properly in effecting valve tightness.

An important element in the change of the design in this type of valve has been to make the plane configuration of the inclined wedging or contact surfaces of circular form, and thereby allow the latter surfaces to be more easily and more inexpensively machined by turning them while chucked in a lathe or the like rotating machining means, as distinguished from a planer or shaper.

Another feature and benefit derived from the change in design is the fact that a better and more uniform loading on the body seats is obtained due to the greater accuracy in the dimensions of the circular inclined wedging faces.

This invention is an improvement over the type of structure shown in U. S. Patent #2,504,924 for a conduit gate valve granted on April 18, 1950.

Other objects and advantages will become more readily apparent upon proceeding with the specification read in light of the accompanying drawings, in which Fig. 1 is a fragmentary sectional assembly view of a conduit gate valve embodying this invention.

Fig. 2 is a plan exterior view of the floating half disc converging wedge surfaces.

Fig. 3 is a plan view of the actuating or stem half disc converging wedge surfaces.

Similar reference numerals apply to similar parts throughout the several views.

Figure 1:
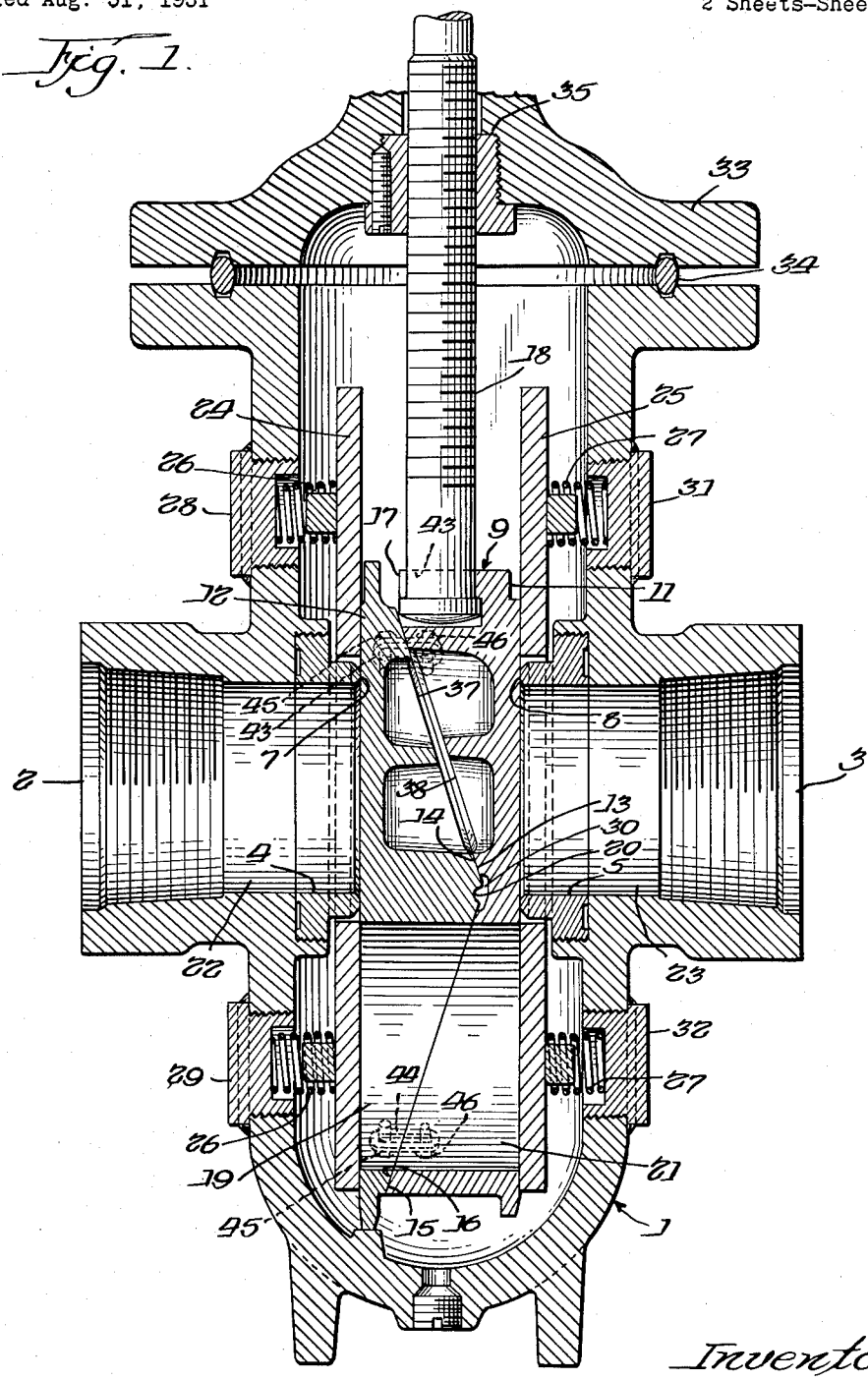
Figure 1:

Referring now to Fig. 1, the general valve construction follows the details of the patent above referred to, in which a body or casing, generally designated 1, is provided with the usual inlet connection 2 and the outlet connection 3. The valve casing 1 is preferably fitted with the usual inlet and outlet seats 4 and 5 respectively, threadedly received within the casing, as indicated, and provided with the conventional annular contact faces 7 and 8 respectively. The closure member, generally designated 9, consists of the stem or actuating half 11 and the lazy or floating half 12, each of which is provided with the oppositely disposed converging wedge surfaces 13, 14, 15, and 16, as indicated, and separated by the respective grooves end disposed at 20 and 30.

The stem half disc is so called because of its provision for the head portion 17 receiving the actuating stem 18 to effect the reciprocating movement of the combined closure, generally designated 9.

Thus, it will be noted that the lower portion of each of the disc halves, as at 19 and 21, is provided with the passages matching with the port openings 22 and 23 respectively in the valve casing 1 in the open position of the valve. While in the closed position, as indicated, the upper portion of the disc halves shut off the line flow. Preferably, for purpose of enhancing the guiding of the split halves of the disc 9 during the course of such reciprocating movement, it has been found preferable to use the resiliently mounted guide plates 24 and 25 spring supported as at 26 and 27 within the respective enclosing plugs 28, 29, 31, and 32.

The casing or body chamber at its upper end portion is closed in fluid sealing relation by means of the bonnet 33 and the gasket 34, the bonnet serving by means of the bushing 35 as the journalling means for the threaded rising stem 18.

The usual handwheel (not shown) is provided for rotating the stem in order to reciprocatingly move the latter member. Thus far, in all of its aspects of structure, the device is similar to that described in connection with the above mentioned patent.

However, as shown more clearly in Figs. 2 and 3 in the instant structure, the raised face portions 13 and 14 and 15 and 16 wedging surfaces are respectively centered as circles around a central point for each circle, designated 36, which in each case when machining the respective contact faces forming the disc wedge 13 to 16 inclusive, the centers 36 serve as the axis of rotation for the rotation of the chucks employed on a turret lathe or the like. It should be noted that the portions 37, 38, 41, and 42 are intentionally recessed or panelled below the raised faces 13 to 16 inclusive in order that the said contact or wedge faces may serve as the only points of contact in the wedging operation between the respective disc halves at the opening and closing limits of movement of the valve. Thus, when the respective floating half of the disc and the stem half are machined insofar as the contact faces 13 to 16 inclusive are concerned, it will be clear that the center or axis of rotation of the chuck is applied at the point 36 as the center of rotation thereby to produce a turned surface as distinguished from the more expensive previous milled or planed surfaces. It has also been found that such method of machining is conducive to a more accurate surface resulting in forming a better wedge contact and overcoming the difficulty of sticking or binding during the course of valve operation.

In the drawings, the disc halves are illustrated as being held together by a pair of links in dotted lines designated 43 and 44, and held by means of the screws 45 and 46 respectively. The latter are tapped and held firmly, as at 40, in their connection with the respective disc halves 11 and 12. However, this construction is not a part of this invention, but is covered by a pending patent application, Serial No. 244,658, filed August 31, 1951.

The particular shape of the wedging surface parts with the raised faces may, of course, be changed slightly without departing from the spirit of the invention as defined by the scope of the appended claim.

I claim:

In a conduit type of gate valve, the structure comprising a pair of disc halves in back-to-back relation and having blanked and ported portions, the oppositely disposed surface portions of the backs of each of the disc halves consisting of a pair of converging inclined surfaces to form therebetween substantially vertically disposed V-surfaces having raised face portions, the converging inclined surfaces of one disc half being nested within and snugly bearing against the converging inclined surfaces of the other disc half, each of said raised face portions having oppositely disposed relieved portions defining the inner and outer peripheral limits of the said raised face portions, the said raised face portions being of circular configuration, each of said latter portions being machinable independently by rotation on their axial centers forming the circular configuration, each of the said disc halves at the point of convergence of the said inclined V-surfaces having a further relieved portion therebetween extending substantially transversely to the V-surfaces and the vertical plane of the said disc halves.

References Cited in the file of this patent

UNITED STATES PATENTS

| | | |
|---|---|---|
| 660,349 | Turnbull | Oct. 23, 1900 |
| 1,618,349 | Olsen | Feb. 2, 1927 |
| 2,002,780 | Laurent | May 28, 1935 |
| 2,326,988 | Wilson | Aug. 17, 1943 |
| 2,394,128 | Wennerby | Feb. 5, 1946 |
| 2,479,124 | Laurent | Aug. 16, 1949 |

FOREIGN PATENTS

| | | |
|---|---|---|
| 5,301 | Great Britain | Apr. 12, 1887 |